(12) United States Patent
Lavoie et al.

(10) Patent No.: US 7,966,554 B2
(45) Date of Patent: Jun. 21, 2011

(54) FINANCIAL DISCLOSURE CONTENT SYNCHRONIZING SOFTWARE

(75) Inventors: Andre Lavoie, Boston, MA (US); Mayer M. Danzig, Somerville, MA (US); Roland C. Beaulieu, Littleton, MA (US)

(73) Assignee: Thomson Financial LLC, New York, NY (US)

( * ) Notice: Subject to any disclaimer, the term of this patent is extended or adjusted under 35 U.S.C. 154(b) by 311 days.

(21) Appl. No.: 10/798,121

(22) Filed: Mar. 11, 2004

(65) Prior Publication Data

US 2005/0015709 A1    Jan. 20, 2005

Related U.S. Application Data

(60) Provisional application No. 60/453,751, filed on Mar. 11, 2003, provisional application No. 60/462,065, filed on Apr. 11, 2003, provisional application No. 60/461,386, filed on Apr. 10, 2003.

(51) Int. Cl.
*G06F 17/00* (2006.01)

(52) U.S. Cl. ........ 715/208; 715/201; 715/204; 715/273; 704/235; 704/277

(58) Field of Classification Search ............... 715/500.1, 715/501.1, 204, 208, 273, 201; 704/235, 704/277
See application file for complete search history.

(56) References Cited

U.S. PATENT DOCUMENTS

| | | | |
|---|---|---|---|
| 5,502,637 A | 3/1996 | Beuaulieu et al. | 364/408 |
| 6,260,011 B1* | 7/2001 | Heckerman et al. | 704/235 |
| 6,665,835 B1* | 12/2003 | Gutfreund et al. | 715/500.1 |
| 6,802,041 B1* | 10/2004 | Rehm | 715/500.1 |
| 6,834,371 B1* | 12/2004 | Jensen et al. | 715/500.1 |
| 7,133,829 B2* | 11/2006 | Cyr et al. | 704/270.1 |
| 7,412,643 B1* | 8/2008 | Fischer et al. | 715/200 |
| 7,487,086 B2* | 2/2009 | Griggs | 704/235 |
| 2002/0122078 A1* | 9/2002 | Markowski | 345/853 |
| 2002/0129057 A1* | 9/2002 | Spielberg | 707/512 |
| 2006/0277453 A1* | 12/2006 | Smith et al. | 715/500.1 |

* cited by examiner

*Primary Examiner* — Stephen S Hong
*Assistant Examiner* — Matthew J Ludwig
(74) *Attorney, Agent, or Firm* — Covington & Burling LLP; Andrea G. Reister; Gregory S. Discher

(57) ABSTRACT

An apparatus and method for providing security disclosure information in at least two aligned formats, the apparatus including security disclosure data in an audio format, a processor for receiving the audio security disclosure data and for inserting a first marker therein and said processor for creating a text from the audio security disclosure data and for inserting a second marker in the text in a position corresponding to a location of the first marker in the audio security disclosure data.

66 Claims, 5 Drawing Sheets

FINANCIAL DISCLOSURE CONTENT SYNCHRONIZING SOFTWARE

PRIOR APPLICATION

Applicant claims priority benefits under 35 U.S.C. §119(e) of U.S. Provisional Patent Application Ser. No. 60/453,751, filed Mar. 11, 2003, and U.S. Provisional Patent Application Ser. No. 60/462,065, filed Apr. 11, 2003, and U.S. Provisional Patent Application Ser. No. 60/461,386, filed Apr. 10, 2003.

FIELD OF THE INVENTION

Methods, systems, and related software products are provided for delivering different data formats of financial disclosure content thereby enabling users to manipulate a data set in one format to retrieve information from data sets in another format.

BACKGROUND OF THE INVENTION

A prime commodity of the information society in which we live is timely, cost effective and accurate data analysis. However, research is currently produced in prodigious quantities in almost all fields of study, including but not limited to, finance, medicine, engineering, social sciences and government and therefore the goal of timely, cost effective and accurate data analysis is becoming persistently more difficult to achieve due to a analyst's limited resources to study all the available research data.

One of the principal reasons for the flood of research information is the efficiency of modern data processing tools such as word processing and spreadsheet programs, which allow a researcher to generate a highly detailed report in a matter of hours or days when it used to take days and weeks to produce the same report without modern data processing tools. Also, since data produced for prior reports is presently so easy to manipulate, research reports have been expanding in size because a current research report is an updated version of an older research report. As a result, large quantities of research data are generated that can obscure the data that is relevant to an analyst's particular research goal.

For example, an investor that owns a particular company's stock usually cannot wade through every detail of a lengthy 10-Q in order to discern the health of the company when the 10-Q is released because the stock will be moving due to others trading on the information as soon as it is released. As a result, economically sensitive news has an inherent time value characteristic for investors because economically sensitive news is more valuable to investors if it is acted on in real-time or near real-time versus any time delay in action. This inherent time value characteristic of economically sensitive news is the key component in understanding the importance of securities market timing.

Timing in the market is the ability to receive timely economically sensitive news, digest its impact on the security and react accordingly to the conclusions drawn from the impact analysis. Reaction time is important because the pool of competing investors will impound the value of the impact of the economically sensitive news very quickly into a security. The ideal would be for an investor to react instantaneously to economically sensitive news, but in real life an investor will have to settle for a close approximation of the ideal. Accordingly, any delay in reaction to a release of economically sensitive news will result in a less than ideal result for the slow investor.

Consequently, what is need is a system and method that will reduce the research work load by providing the securities information disclosure in different data formats thereby allowing a user to choose which format will provide the appropriate degree of disclosure for their needs. The system and method should also enable a user to easily navigate between data formats because different sections of each information disclosure may require different levels of scrutiny.

SUMMARY OF THE INVENTION

Accordingly, it is an object of the present invention to provide a system to provide a securities information disclosure in different data formats in which each data format is synchronized with the other data formats.

Another object of the present invention is to provide a summary that summarizes the securities information disclosure.

A further object of the present invention is to provide a system that can search securities information disclosures in different data formats by a single search entry.

Still another object of the present invention is to provide a transcript of the securities issuer information disclosure wherein the subject matter of the transcript is linked to substantially correspond to the subject matter of the audio disclosure data.

Still yet another object of the present invention is to provide users an interface to easily and efficiently access and digest securities information disclosures in different formats.

And still yet another object of the present invention is to provide a system whereby the user can access security issuer specific content in varying degrees of specificity thereby allowing the user to choose what level of detail they want to utilize. Also, the varying degrees of content specificity will be linked in a substantially synchronized manner thereby permitting the user to easily navigate between disclosure data in different formats.

These and other objects of the present invention are achieved by providing an apparatus for providing security disclosure information in at least two aligned formats, the apparatus including security disclosure data in an audio format, a processor for receiving the audio security disclosure data and for inserting a first marker therein and said processor for creating a text from the audio security disclosure data and for inserting a second marker in the text in a position corresponding to a location of the first marker in the audio security disclosure data.

Preferably, the apparatus also includes where said text is at least one of a transcript of said audio security disclosure data and a summary of said audio security disclosure data and further comprises an user interface in communication with said processor for delivering proximately said first marker audio data with said second marker text.

The apparatus can also includes where said first marker audio data is delivered on said user interface as a selectable connection which when selected will enable said processor to deliver to said user interface said second marker text, said second marker text is delivered on said user interface as a selectable connection which when selected will enable said processor to deliver to said user interface said first marker audio data, the insertion of said first marker in the audio data is based on at least one of time, phonemes, sections, metadata, and patterns, the insertion of said second marker in the text is based on at least one of time, sections, patterns, letters, words, sentences, paragraphs, alphanumeric characters, metadata, and statistics of contextual information, and said security disclosure data also includes visual data and said processor inserts a third marker in said visual data in a position corresponding to at least one of the first marker location in the audio data and the second marker location in the text.

Preferably, the apparatus also includes an user interface in communication with the processor for delivering proximately said third marker visual data with at least one of said first marker audio data and said second marker text to said user interface, said first marker audio data is delivered on said user interface as a selectable connection which when selected will enable said processor to deliver to said user interface said third marker visual data, said first marker audio data is delivered on said user interface as a selectable connection which when selected will enable said processor to deliver to said user interface said second marker text portion, said first marker audio data is delivered on said user interface as a selectable connection which when selected will enable said processor to deliver to said user interface said second marker text and said third marker visual data, said second marker text is delivered on said user interface as a selectable connection which when selected will enable said processor to deliver to said user interface said third marker visual data, said second marker text is delivered on said user interface as a selectable connection which when selected will enable said processor to deliver to said user interface said first marker audio data, said second marker text is delivered on said user interface as a selectable connection which when selected will enable said processor to deliver to said user interface said first marker audio data and said third marker visual data, said third marker visual data is represented on said user interface as a selectable connection which when selected will enable said processor to deliver to said user interface said first marker audio data, said third marker visual data is represented on said user interface as a selectable connection which when selected will enable said processor to deliver to said user interface said second marker text, and said third marker visual data is represented on said user interface as a selectable connection which when selected will enable said processor to deliver to said user interface said second marker text and said first marker audio data.

The apparatus can also includes where said processor inserts a plurality of first markers into said audio data and a plurality of second markers in the text, said processor inserting each second marker in the text in a position corresponding to the location of a particular first marker in the audio data and further comprising an user interface in communication with said processor for delivering proximately each particular first marker audio data with corresponding second marker text on said user interface, wherein each first marker audio data is delivered on said user interface as a selectable connection which when selected will enable said processor to deliver to said user interface corresponding said second marker text, wherein each second marker text is delivered on said user interface as selectable connections which when selected will enable said processor to deliver to said user interface said corresponding first marker audio data, wherein the insertion of said plurality of first markers in the audio data are based on at least one of time, phonemes, sections, metadata, and patterns, wherein the insertion of said plurality of second markers in the text are based on at least one of time, sections, patterns, letters, words, sentences, paragraphs, alphanumeric characters, metadata, and statistics of contextual information, and wherein said security disclosure data also includes visual data and said processor inserts a plurality of third markers in said visual data, said processor inserting each third marker in the visual data in a position corresponding to the location of at least one of a particular first marker and a specific second marker.

Preferably, the apparatus also includes an user interface in communication with the processor for delivering proximately said plurality of third marker visual data with at least one of corresponding said first marker audio data portions and said second marker text to said user interface, wherein said first marker audio data is delivered on said user interface as a selectable connection which when selected will enable said processor to deliver to said user interface corresponding said third marker visual data, wherein said first marker audio data are delivered on said user interface as a selectable connection which when selected will enable said processor to deliver to said user interface corresponding said second marker text, wherein said first marker audio data is delivered on said user interface as a selectable connection which when selected will enable said processor to deliver to said user interface corresponding said second marker text and said third marker visual data, wherein said second marker text is delivered on said user interface as a selectable connection which when selected will enable said processor to deliver to said user interface said third marker visual data, wherein said second marker text is delivered on said user interface as a selectable connection which when selected will enable said processor to deliver to said user interface corresponding said first marker audio data, wherein said second marker text is delivered on said user interface as a selectable connection which when selected will enable said processor to deliver to said user interface corresponding said first marker audio data and said second marker visual data, wherein said third marker in the visual data delivered to said user interface is represented on said user interface as a selectable connection which when selected will enable said processor to deliver to said user interface corresponding said first marker audio data, wherein said third marker in the visual data delivered to said user interface is represented on said user interface as a selectable connection which when selected will enable said processor to deliver to said user interface corresponding said second marker text, wherein said third marker in the visual data delivered to said user interface is represented on said user interface as a selectable connection which when selected will enable said processor to deliver to said user interface corresponding said second marker text and said first marker audio data, wherein the insertion of said first markers in the audio data are based on at least one of time, phonemes, sections, metadata, and patterns, wherein the insertion of said second markers in the text are based on at least one of time, sections, patterns, letters, words, sentences, paragraphs, alphanumeric characters, metadata, and statistics of contextual information, and wherein the insertion of said third markers in the visual data are based on at least one of time, sections, patterns, colors, and metadata.

The invention further includes a method for providing security disclosure information in at least two aligned formats, the method including the steps of receiving audio security disclosure data, inserting a first marker into the received audio security disclosure data, creating a text from the audio security disclosure data and inserting a second marker in the text in a position corresponding to a location of the first marker in the audio security disclosure data.

Other objects, features and advantages according to the present invention will become apparent from the following detailed description of certain advantageous embodiments when read in conjunction with the accompanying drawings in which the same components are identified by the same reference numerals.

BRIEF DESCRIPTION OF THE DRAWINGS

FIG. 4 is exemplary screen shot of the user interface in accordance with the invention of FIG. 1; and FIG. 5 is exemplary screen shot of the user interface in accordance with the invention of FIG. 1.

DETAILED DESCRIPTION OF CERTAIN ADVANTAGEOUS EMBODIMENTS

Figure 1:
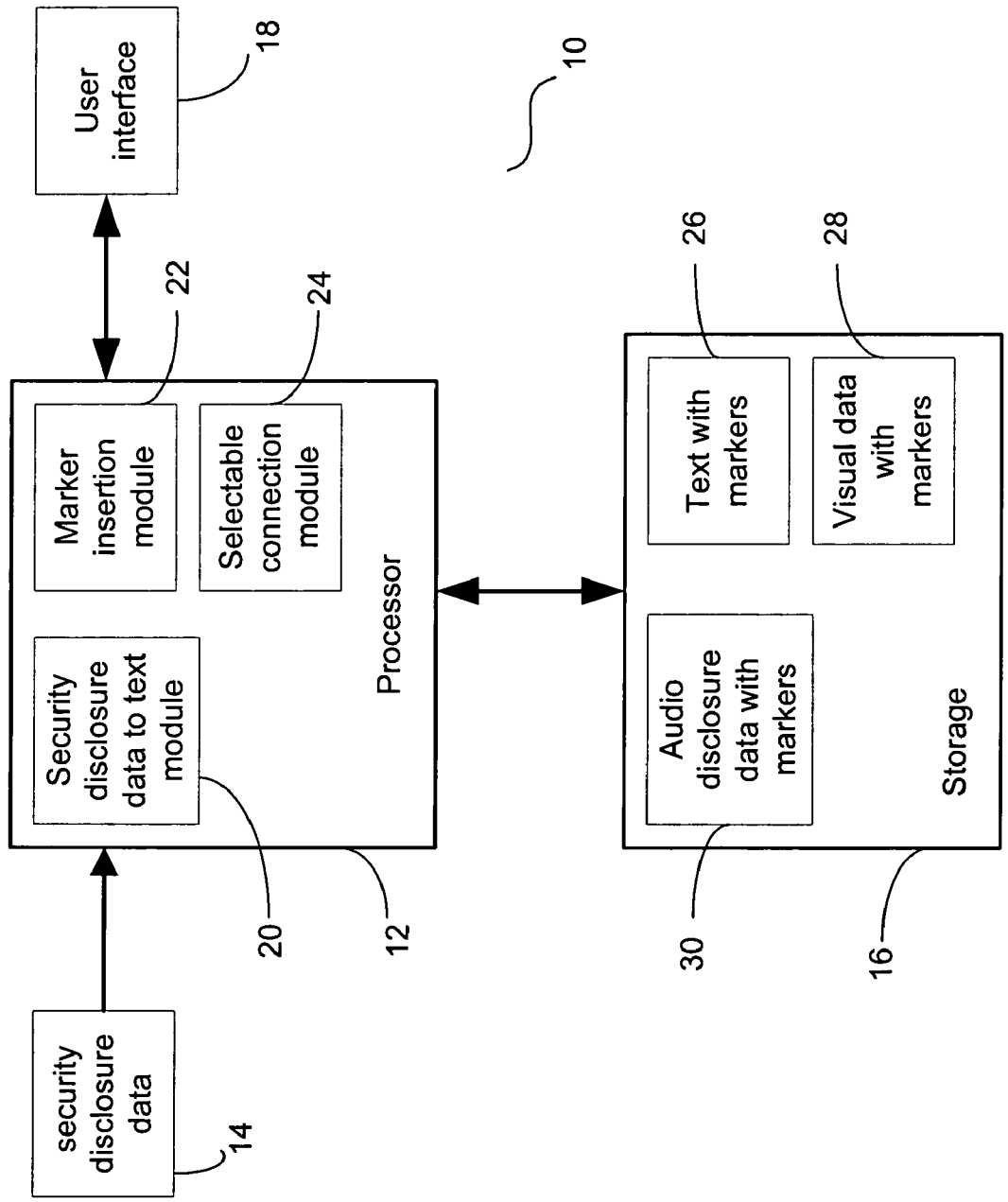
FIG. 1 is a block diagram of a system for generating a securities information disclosure in various data formats that are substantially synchronized in accordance with the present invention.

Methods, systems and related software products are provided for creating a system 10 in which security issuers' audio disclosure information can be formatted in multiple formats that are linked. Referring to FIG. 1, system 10 includes a processor 12 such as a computer, which receives security disclosure data 14. Security disclosure data is information such as an earnings call/presentation data, guidance call/presentation data, sales call/presentation data, shareholder/annual meeting data, and the like.

Processor 12 is coupled with storage 16 which is the primary and secondary memory of processor 12 and can store the security disclosure data in multiple formats. Processor 12 is also in communication with user interface 18 which is generally a remote browser from which a user can access the security disclosure data in processor 12 or storage 16. User interface 18 can also be an application specific interface.

Processor 12 includes a security disclosure data to text module 20, which generates from the audio data portion of the security disclosure data a text of the security disclosure data. The text can be a verbatim transcript, near verbatim, and/or a summary of the audio data. Processor 12 also includes a marker insertion module 22, which places a marker in the different formats of the security disclosure data at a location where each data format's subject matter can be related and/or substantially synchronized.

Figure 2:
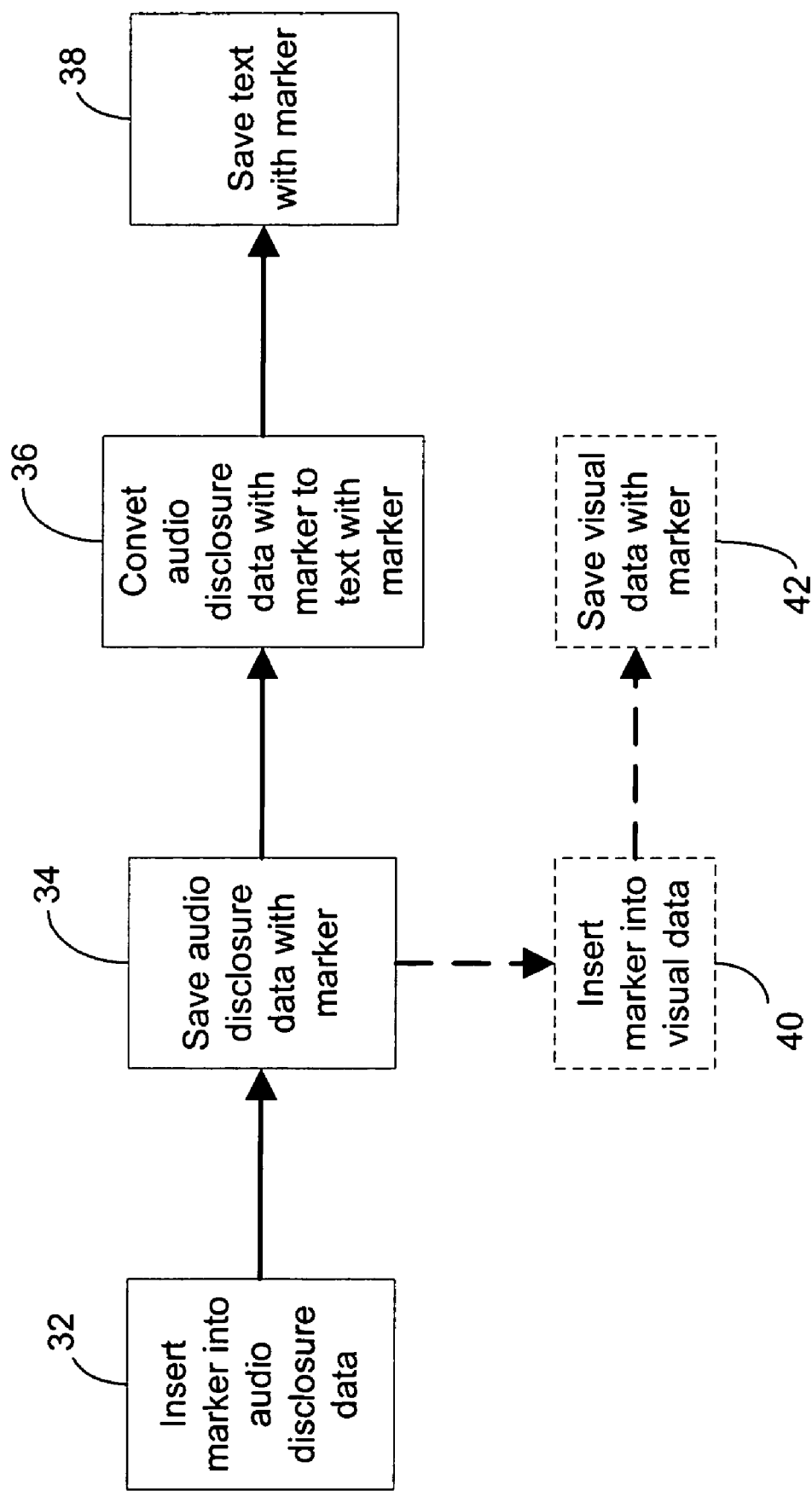
FIG. 2 is a flowchart of the generation of the different data formats and the substantial synchronization of the different data formats in accordance with the invention of FIG. 1.

For example, referring to block 32 of FIG. 2, a marker is inserted into the audio portion of the disclosure data. The marker is placed according to criteria based on at least one of time, phonemes, sections, metadata, patterns, and/or subject matter of the disclosure data and the number of markers inserted into the audio data is dependent on the user's needs. The audio data with at least one marker is saved to storage 16 for later retrieval at block 34.

Security disclosure data to text module 20 makes a text of the audio data and notes where the marker or markers where inserted into the audio data. Marker insertion module 22 inserts a particular marker in the text format that corresponds to the location of a particular marker inserted in the audio data at block 36 and the insertion is based on at least one of time, sections, patterns, letters, words, sentences, paragraphs, alphanumeric characters, metadata, statistics of contextual information, and/or subject matter. Text with markers 26 are saved in storage 16 at block 38.

An alternative embodiment of the present invention will also enable the insertion of a marker into visual data corresponding to the location of a particular marker in the audio data by marker insertion module 22 at block 40. The marker inserted into the visual data will enable system to substantially align portions of the visual data with a portion of the audio data and text. The marker in visual data is based on at least one of time, sections, patterns, colors, metadata, and/or subject matter. Visual data with markers 28 is saved to storage 16 at block 42.

The markers inserted into the different portions of each data formats enable a selectable connection for each marker. Selectable connection module 24 delivers the data including the markers to the user on user interface 18 as visually distinct such as by shading, coloration, bolding or the like. The visual distinct portion moves as the user scrolls through the data, over time, and/or according to the activation by user interface's 18 cursor. The selectable connection is similar in concept to hyperlinking but instead of transferring a user to a different concept, the selectable connection is used to transfer the user to data with a similar concept to the selectable connection but in a different data format.

Figure 3:
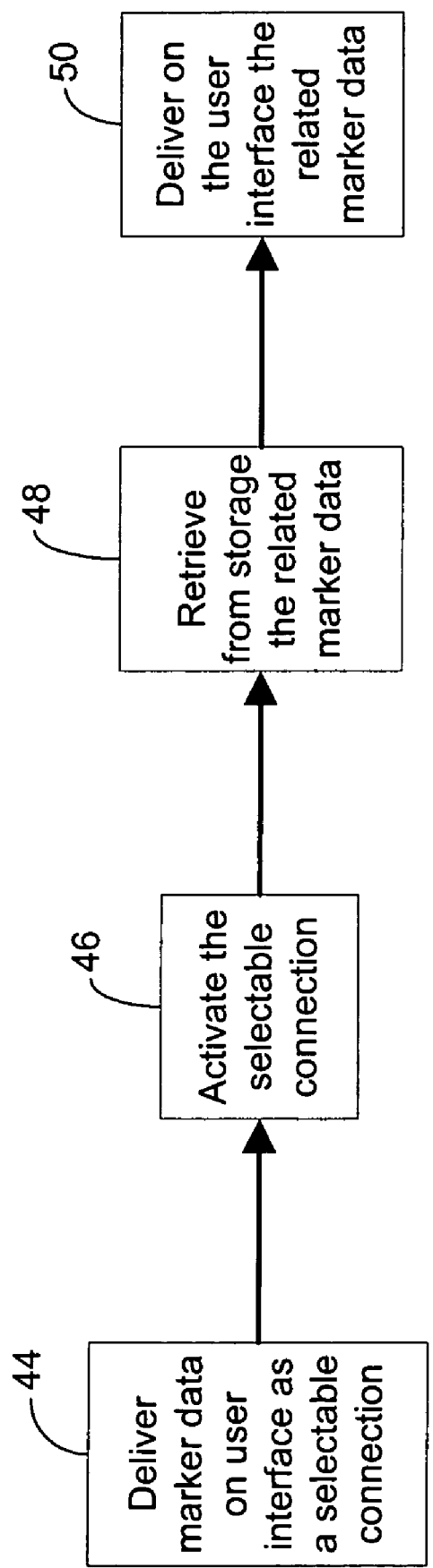
FIG. 3 is a flowchart showing an exemplary manner in which the substantially synchronized data formats are delivered and retrieved on a user interface in accordance with the invention of FIG. 1.

Referring now to FIG. 3, an user is provided with security disclosure data including markers as selectable connections on user interface 18 at block 44. The user can activate a selectable connection such as by clicking on the selectable connection, at block 46. The activation of the selectable connection will cause processor 12 to retrieve from storage 16 other data formats that corresponds to the marker that the selectable connection represents at block 48. Processor 12 delivers the portion of the data formats that correspond to the activated selectable connection at block 50.

Figure 4:
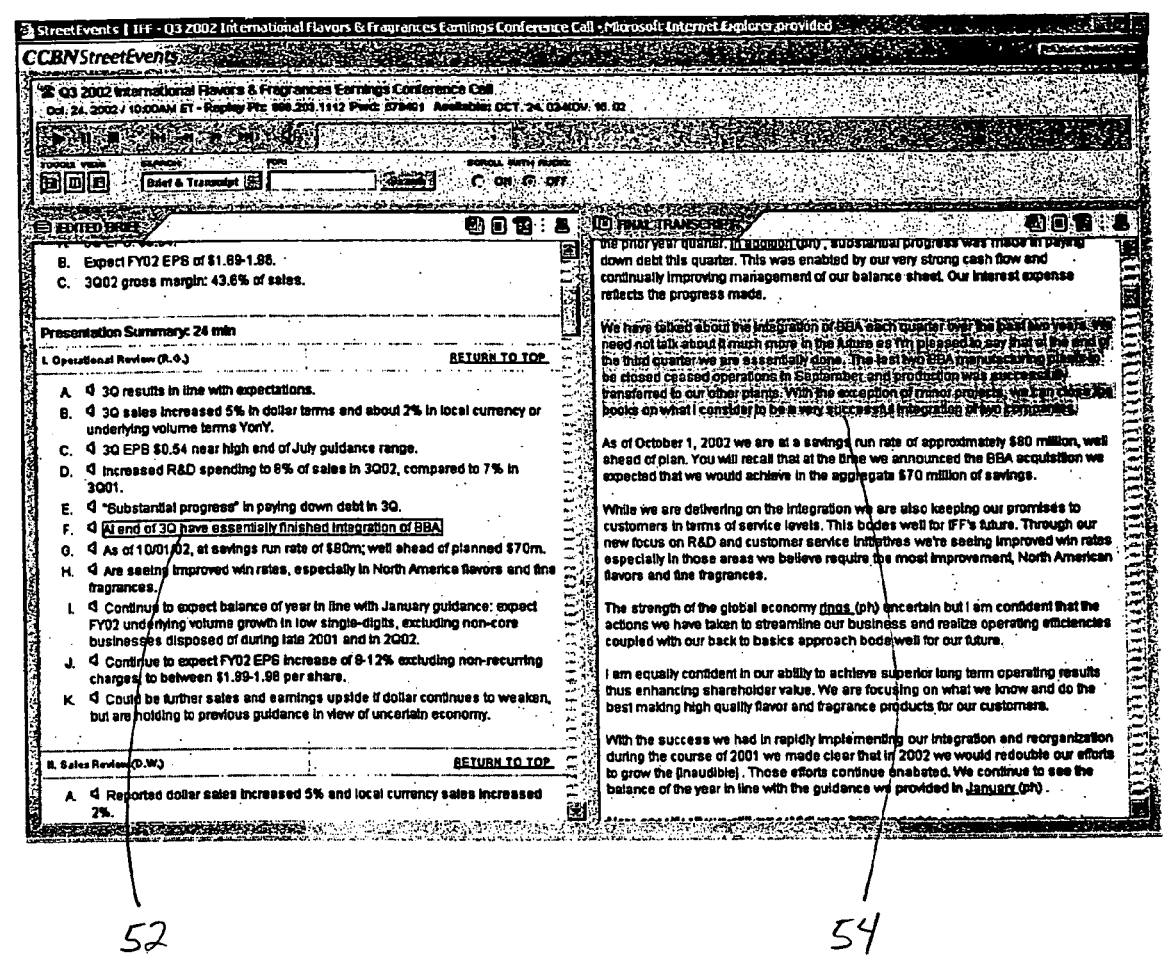

For example, the activation of selectable connection 52 causes selectable connection 54 to move to the position represented in FIG. 4. As a result, the user can be viewing both a transcript with markers and a summary with markers on user interface 18 and a single line in the summary will be presented as visually distinct while an entire paragraph of the corresponding transcript is highlighted because the broad concept in the single line of the summary represents all the concepts in the transcript paragraph. In both instances, the visually distinct portion represents one marker in the summary format of the text and in the transcript format of the text.

Consequently, the user can read the summary, find a point of interest in the summary, activate any portion of the summary because every portion of the summary is a selectable connection, and have delivered on user interface 18 corresponding transcript data. Likewise, any portion of the transcript can be activated and the user can be delivered corresponding summary data.

Figure 5:
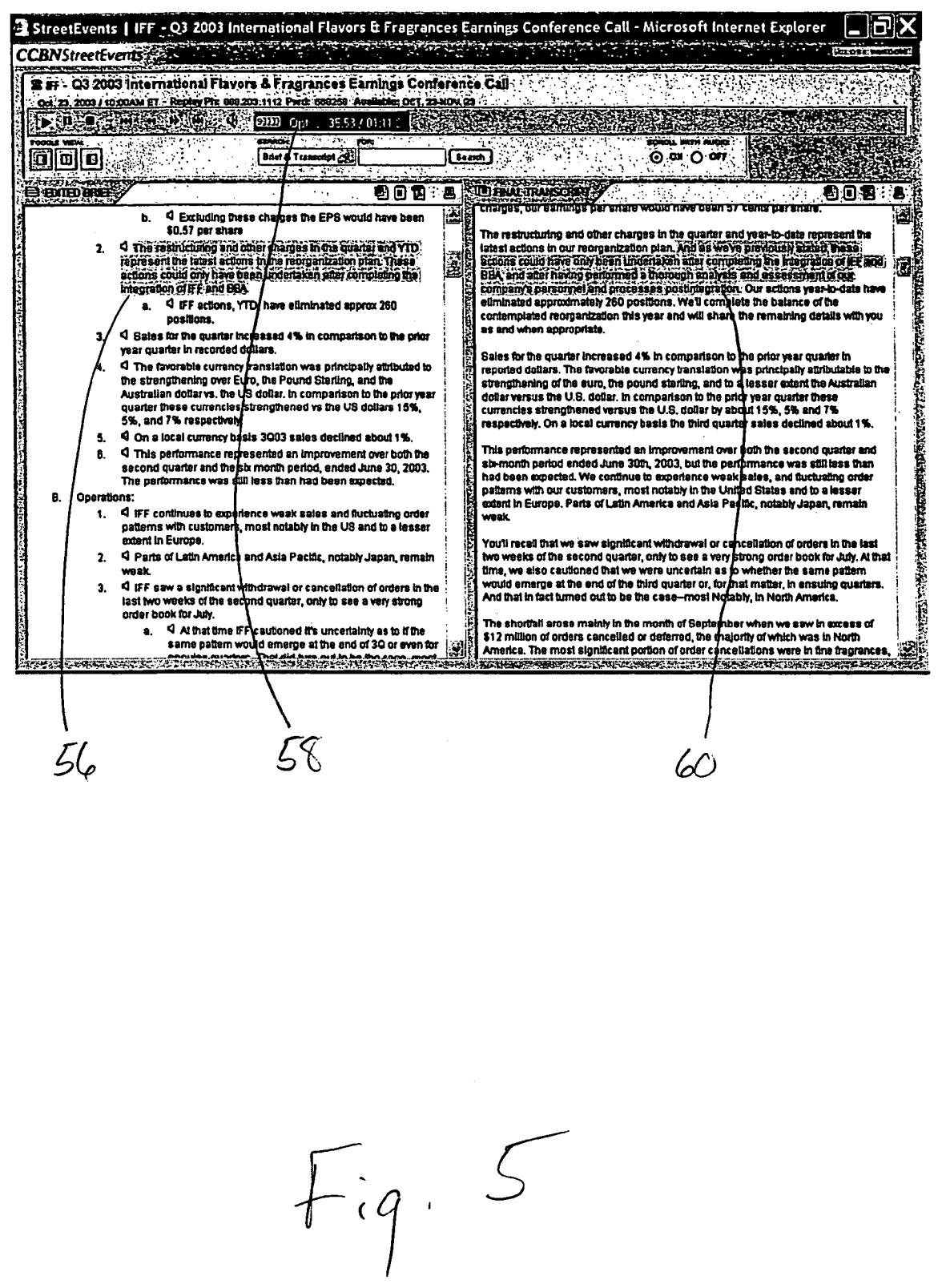

Furthermore, the selectable connections work in other data formats such as for audio data, visual data, multimedia data and the like. For instance, as a user listens to audio data 58, the summary selectable connection 56 and transcript selectable connection 60 moves through the data set corresponding to where the markers in each data format are related to the markers in the audio data as is shown in FIG. 5. In this example, the markers were placed to substantially synchronize the subject matter of the different data formats thereby enabling processor 12 to deliver to user interface 18 at substantially the same time similar subject matter but in data formats.

Thus, system 10 provides the user a way to access and search security disclosure data in different data formats according to their needs because all the security disclosure data sets are integrated and substantially synchronized. For instance, the user can use summary data to gauge the importance of a security issuer disclosure, or a section of such disclosure, without having to read through all the details of the disclosure. If the user deems a portion of the disclosure data important in the summary, than the user can view the related transcript text by activating the selectable connection to understand the finer details and context not available in summary.

Also, the use of corresponding markers in security disclosure data in different formats enables a user to easily search the different data formats for information that would be difficult to access otherwise. For instance, using text data to locate the corresponding audio data and/or video data that produced it will enable a user to study visual and audio nuance that is missing from the text such as the tone of voice and the body language of the person delivering the information.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An apparatus for providing security disclosure data in at least two aligned formats, the apparatus comprising:
    a storage medium comprising security disclosure data in an audio format and a visual format comprising video data;
    a processor for receiving the audio security disclosure data at a first time and for inserting a first marker therein;
    said processor for creating, without human input, a text adapted to be visually displayed directly from the audio security disclosure data at a second time subsequent to the first time and for inserting a second marker in the text in a position corresponding to a location of the first marker in the audio security disclosure data;
    said processor for inserting a third marker in said visual data in a position corresponding to at least one of the first marker location in the audio data and the second marker location in the text; and
    said processor for creating, without human input, a summary text corresponding to the text adapted to be visually displayed, wherein the summary text is created directly from the audio security disclosure data, and wherein the summary text is shorter than the text adapted to be visually displayed and for inserting a fourth marker in said summary text in a position corresponding to at least one of the first marker location in the audio data and the second marker location in the text.

2. The apparatus of claim 1 wherein said text is a transcript of said audio security disclosure data.

3. The apparatus of claim 2 further comprising a user interface in communication with said processor for delivering proximately said first marker audio data with said second marker text.

4. The apparatus of claim 3 wherein said first marker audio data is delivered on said user interface as a selectable connection which when selected will enable said processor to deliver to said user interface said second marker text.

5. The apparatus of claim 3 wherein said second marker text is delivered on said user interface as a selectable connection which when selected will enable said processor to deliver to said user interface said first marker audio data.

6. The apparatus of claim 2 wherein when a user selects a portion of the summary text, a corresponding portion of said transcript text is simultaneously displayed for viewing with the summary text.

7. The apparatus of claim 2 wherein the insertion of said second marker in the text is based on time.

8. The apparatus of claim 2 wherein said processor inserts a plurality of first markers into said audio data and a plurality of second markers in the text, said processor inserting each second marker in the text in a position corresponding to the location of a particular first marker in the audio data.

9. The apparatus of claim 8 further comprising a user interface in communication with said processor for delivering proximately each particular first marker audio data with corresponding second marker text on said user interface.

10. The apparatus of claim 8 wherein the insertion of said plurality of first markers in the audio data are based on at least one of time, phonemes, sections, metadata, and patterns.

11. The apparatus of claim 9 wherein each first marker audio data is delivered on said user interface as a selectable connection which when selected will enable said processor to deliver to said user interface corresponding said second marker text.

12. The apparatus of claim 11 wherein each second marker text is delivered on said user interface as selectable connections which when selected will enable said processor to deliver to said user interface said corresponding first marker audio data.

13. The apparatus of claim 11 wherein the insertion of said plurality of second markers in the text are based on at least one of time, sections, patterns, letters, words, sentences, paragraphs, alphanumeric characters, metadata, and statistics of contextual information.

14. The apparatus of claim 11 wherein said processor inserts a plurality of third markers in said visual data, said processor inserting each third marker in the visual data in a position corresponding to the location of at least one of a particular first marker and a specific second marker.

15. The apparatus of claim 14 further comprising a user interface in communication with the processor for delivering proximately said plurality of third marker visual data with at least one of corresponding said first marker audio data portions and said second marker text to said user interface.

16. The apparatus of claim 15 wherein said first marker audio data is delivered on said user interface as a selectable connection which when selected will enable said processor to deliver to said user interface corresponding said third marker visual data.

17. The apparatus of claim 16 wherein the insertion of said first markers in the audio data are based on at least one of time, phonemes, sections, metadata, and patterns.

18. The apparatus of claim 16 wherein the insertion of said second markers in the text are based on at least one of time, sections, patterns, letters, words, sentences, paragraphs, alphanumeric characters, metadata, and statistics of contextual information.

19. The apparatus of claim 16 wherein the insertion of said third markers in the visual data are based on time.

20. The apparatus of claim 16 wherein the insertion of said third markers in the visual data are based on sections.

21. The apparatus of claim 16 wherein the insertion of said third markers in the visual data are based on patterns.

22. The apparatus of claim 16 wherein the insertion of said third markers in the visual data are based on colors.

23. The apparatus of claim 16 wherein the insertion of said third markers in the visual data are based on metadata.

24. The method of claim 20, wherein the act of inserting a first marker into the received audio security disclosure data occurs automatically.

25. The apparatus of claim 15 wherein said first marker audio data are delivered on said user interface as a selectable connection which when selected will enable said processor to deliver to said user interface corresponding said second marker text.

26. The apparatus of claim 25 wherein said second marker text is delivered on said user interface as a selectable connection which when selected will enable said processor to deliver to said user interface said third marker visual data.

27. The apparatus of claim 25 wherein said second marker text is delivered on said user interface as a selectable connection which when selected will enable said processor to deliver to said user interface corresponding said first marker audio data.

28. The apparatus of claim 25 wherein said second marker text is delivered on said user interface as a selectable connection which when selected will enable said processor to deliver to said user interface corresponding said first marker audio data and said third marker visual data.

29. The apparatus of claim 25 wherein said third marker in the visual data delivered to said user interface is represented on said user interface as a selectable connection which when selected will enable said processor to deliver to said user interface corresponding said first marker audio data.

30. The apparatus of claim 25 wherein said third marker in the visual data delivered to said user interface is represented on said user interface as a selectable connection which when selected will enable said processor to deliver to said user interface corresponding said second marker text.

31. The apparatus of claim 25 wherein said third marker in the visual data delivered to said user interface is represented on said user interface as a selectable connection which when selected will enable said processor to deliver to said user interface corresponding said second marker text and said first marker audio data.

32. The apparatus of claim 15 wherein said first marker audio data is delivered on said user interface as a selectable connection which when selected will enable said processor to deliver to said user interface corresponding said second marker text and said third marker visual data.

33. The apparatus of claim 2 wherein the insertion of said second marker in the text is based on sections.

34. The apparatus of claim 2 wherein the insertion of said second marker in the text is based on patterns.

35. The apparatus of claim 2 wherein the insertion of said second marker in the text is based on letters.

36. The apparatus of claim 2 wherein the insertion of said second marker in the text is based on words.

37. The apparatus of claim 2 wherein the insertion of said second marker in the text is based on sentences.

38. The apparatus of claim 2 wherein the insertion of said second marker in the text is based on paragraphs.

39. The apparatus of claim 2 wherein the insertion of said second marker in the text is based on alphanumeric characters.

40. The apparatus of claim 2 wherein the insertion of said second marker in the text is based on metadata.

41. The apparatus of claim 2 wherein the insertion of said second marker in the text is based on statistics of contextual information.

42. The apparatus of claim 1 further comprising a user interface in communication with the processor for delivering proximately said third marker visual data with at least one of said first marker audio data and said second marker text to said user interface.

43. The apparatus of claim 42 wherein said first marker audio data is delivered on said user interface as a selectable connection which when selected will enable said processor to deliver to said user interface said third marker visual data.

44. The apparatus of claim 43 wherein said first marker audio data is delivered on said user interface as a selectable connection which when selected will enable said processor to deliver to said user interface said second marker text and said third marker visual data.

45. The apparatus of claim 43 wherein said second marker text is delivered on said user interface as a selectable connection which when selected will enable said processor to deliver to said user interface said third marker visual data.

46. The apparatus of claim 43 wherein said second marker text is delivered on said user interface as a selectable connection which when selected will enable said processor to deliver to said user interface said first marker audio data.

47. The apparatus of claim 43 wherein said second marker text is delivered on said user interface as a selectable connection which when selected will enable said processor to deliver to said user interface said first marker audio data and said third marker visual data.

48. The apparatus of claim 43 wherein said third marker visual data is represented on said user interface as a selectable connection which when selected will enable said processor to deliver to said user interface said first marker audio data.

49. The apparatus of claim 43 wherein said third marker visual data is represented on said user interface as a selectable connection which when selected will enable said processor to deliver to said user interface said second marker text.

50. The apparatus of claim 43 wherein said third marker visual data is represented on said user interface as a selectable connection which when selected will enable said processor to deliver to said user interface said second marker text and said first marker audio data.

51. The apparatus of claim 42 wherein said first marker audio data is delivered on said user interface as a selectable connection which when selected will enable said processor to deliver to said user interface said second marker text portion.

52. The apparatus of claim 1 wherein the insertion of said first marker in the audio data is based on phonemes.

53. The apparatus of claim 1 wherein the insertion of said first marker in the audio data is based on sections.

54. The apparatus of claim 1 wherein the insertion of said first marker in the audio data is based on metadata.

55. The apparatus of claim 1 wherein the insertion of said first marker in the audio data is based on patterns.

56. The apparatus of claim 1 wherein said text is a verbatim or near verbatim text of said audio security disclosure data.

57. The apparatus according to claim 1, wherein the security disclosure data comprises tradable security disclosure data.

58. A computer-implemented method for providing security disclosure data in at least two aligned formats, the method comprising:
   receiving by a computer audio security disclosure data at a first time;
   inserting by the computer a first marker into the received audio security disclosure data;
   creating, by the computer and without human input, a text adapted to be visually displayed directly from the audio security disclosure data at a second time subsequent to the first time;
   inserting a second marker in the text corresponding to a location of the first marker in the audio security disclosure data;
   receiving by the computer visual data comprising video data;
   inserting a third marker in said visual data in a position corresponding to at least one of the first marker location in the audio data and the second marker location in the text;
   creating, by the computer and without human input, a summary text corresponding to the text adapted to be visually displayed, wherein the summary text is created directly from the audio security disclosure data, and wherein the summary text is shorter than the text adapted to be visually displayed; and inserting a fourth marker in said summary text in a position corresponding to at least one of the first marker location in the audio data and the second marker location in the text.

59. The method according to claim 58, wherein the security disclosure data comprises tradable security disclosure data.

60. A computer-implemented method for providing security disclosure information in at least two aligned formats, the method comprising:
- receiving by a computer audio security disclosure data and visual security disclosure data comprising video data;
- inserting by the computer a first marker into the received audio security disclosure data;
- automatically creating, without human input, by the computer a text adapted to be visually displayed directly from the audio security disclosure data;
- inserting by the computer a second marker in the text for aligning a portion of the audio data with a portion of the text;
- inserting a third marker in said visual security disclosure data in a position corresponding to at least one of the first marker location in the audio security disclosure data and the second marker location in the text;
- creating, without human input, a summary text corresponding to the text adapted to be visually displayed, wherein the summary text is created directly from the audio security disclosure data, and wherein the summary text is shorter than the text adapted to be visually displayed; and
- inserting a fourth marker in said summary text in a position corresponding to at least one of the first marker location in the audio data and the second marker location in the text.

61. The method according to claim 60, wherein the security disclosure data comprises tradable security disclosure data.

62. An apparatus for providing security disclosure data in at least two aligned formats, the apparatus comprising:
- a storage medium comprising security disclosure data in an audio format and a visual format comprising video data;
- a processor for receiving the audio security disclosure data at a first time and causing a display monitor to display for simultaneous viewing at a second time subsequent to the first time a first text generated, without human input, from the audio security disclosure data and a second text generated, without human input, from the audio security disclosure data;
- said processor causing said display monitor to display the video data simultaneously with and corresponding to the audio data;
- wherein the first text is a verbatim transcript of the audio security disclosure data and the second text is a summary of the audio security disclosure data; and
- wherein when a user uses the display monitor to select a portion of the second text, a corresponding portion of the first text is simultaneously displayed for viewing with second text.

63. The apparatus according to claim 62, wherein the first text is displayed in a first vertical portion of the display monitor, and the second text is displayed in a second vertical portion of the display monitor.

64. The apparatus according to claim 62, wherein the processor further causes the monitor to display a selectable connection on at least a portion of the first text such that when the selectable connection is activated, the monitor displays a corresponding portion of the summary data.

65. The apparatus according to claim 62, wherein the security disclosure data comprises tradable security disclosure data.

66. An apparatus for providing security disclosure data in at least two aligned formats, the apparatus comprising:
- a processor for receiving audio security disclosure data at a first time and causing a display monitor to display, without human input, for simultaneous viewing at a second time subsequent to the first time
  - i) a first summary text generated from the audio security disclosure data, and
  - ii) a second verbatim text generated from the audio security disclosure data,
- wherein the summary text is displayed in a first vertical portion of the display monitor and the verbatim text is displayed in a second vertical portion of the display monitor, and
- wherein selectively activating a portion of the summary text causes the corresponding verbatim text to be displayed in alignment with the summary text, and wherein the verbatim text is automatically and without human intervention shown as highlighted and the selectively activated portion of the summary text is automatically and without human intervention shown as visually distinct from the portion of the summary text that is not selectively activated.

* * * * *